(12) United States Patent
Miyake (10) Patent No.: US 6,930,960 B2
(45) Date of Patent: Aug. 16, 2005

(54) EXECUTION TIME MEASUREMENT DEVICE IN A CONTROL UNIT AND AN EXECUTION TIME MEASUREMENT METHOD

(75) Inventor: Junji Miyake, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 196 days.

(21) Appl. No.: 10/396,342

(22) Filed: Mar. 26, 2003

(65) Prior Publication Data

US 2003/0187612 A1 Oct. 2, 2003

(30) Foreign Application Priority Data

Mar. 27, 2002 (JP) .................................... 2002-089566

(51) Int. Cl.[7] .............................................. G04F 10/00
(52) U.S. Cl. ...................... 368/113; 702/177; 702/187
(58) Field of Search ............................. 368/108, 113, 368/118, 121; 702/176, 177, 187

(56) References Cited

U.S. PATENT DOCUMENTS

| | | | | |
|---|---|---|---|---|
| 4,807,185 A | * | 2/1989 | Kamiya ...................... 711/200 |
| 5,095,437 A | * | 3/1992 | Shibata et al. .............. 701/102 |
| 5,932,272 A | * | 8/1999 | Raemy et al. .............. 426/573 |

| | | | | |
|---|---|---|---|---|
| 2003/0187336 A1 | * | 10/2003 | Odagiri et al. .............. 600/300 |

FOREIGN PATENT DOCUMENTS

| | | | |
|---|---|---|---|
| JP | 4-349543 | * | 12/1992 |
| JP | 5-165655 | | 7/1993 |
| JP | 2001-92692 A | * | 4/2001 |
| JP | 2001-318807 | | 11/2001 |
| JP | 2001-331343 | | 11/2001 |

OTHER PUBLICATIONS

Road vehicles—Open interface for embedded automotive applications—Part 3: OSEK/VDX Operation System (OS); ISO 200 pp. i–58.

* cited by examiner

*Primary Examiner*—Ren Yan
(74) *Attorney, Agent, or Firm*—Crowell & Moring LLP (57) ABSTRACT

An execution time measurement device in a control unit comprising a free running counter to be updated according to time, means to push stack for working out stack data from the time-of-day value of the free running counter at the time of activation and for pushing it, means to memorize data structure of stack for memorizing the pushed stack data structure, and means to pull stack for calculating the execution time of control operation based on the time-of-day value of the free running counter upon termination of the control operation and the stack data pulled from the means to memorize data structure of stack.

8 Claims, 7 Drawing Sheets

```
1:   unsigned char SP ;           /* SP : Stack Pointer */         ~50
2:   uint 32 time_stack [NO_TASK]  /* NO_TASK : Number of Tasks */
3:                                                                  ~51
4:   bool push_time (void) {
5:          uint 32 time_now ;
6:          if (SP > NO_TASK) {
7:                  return (FALSE) ;
8:          }
9:          DISABLE_TASK_SWITCH_INTERRUPTS ;
10:         time_now = GET_SYSTEM_TIME ;                            ~52
11:         if (SP != 0) {
12:                 time_stack [SP - 1] + = time_now ;
13:         }
14:         time_stack [SP++] = - time_now ;
15:         ENABLE_TASK_SWITCH_INTERRUPTS ;
16:         return (TRUE) ;
17:  }
18:                                                                  ~53
19:  bool pop_time (TickType * exec_time) {
20:         uint 32 time_now ;
21:         if (SP == 0) {
22:                 return (FALSE) ;
23:         }
24:         DISABLE_TASK_SWITCH_INTERRUPTS ;
25:         time_now = GET_SYSTEM_TIME ;                            ~54
26:         * exec_time = time_stack [--SP] + time_now ;
27:         if (SP != 0) {
28:                 time_stack [SP - 1] -= time_now ;
29:         }
30:         ENABLE_TASK_SWITCH_INTERRUPTS ;
31:         return (TRUE) ;
32:  }
```

FIG. 6

9.5 Debugging

Two hook routines (PreTaskHook and PostTaskHook) are called on task context switches.

These two hook routines may be used for debugging or time measurement (including context switch time). Therefore PostTaskHook is called after leaving the context of the old task ; PreTaskHook is called before entering the context of a new task. However, the task is still/already in the running state, and GetTaskId will not return INVALID_TASK.

Figure 20 - PreTaskHook and PostTaskHook

When ShutdownOS is called while a task is running ShutdownOS may or may not call PostTaskHook. If PostTaskHook is called it is undefined if it is called before or after ShutdownHook.

FIG. 7

11.8.2.2 PreTaskHook

| | |
|---|---|
| Syntax | void PreTaskHook (void) |
| Parameter (In) : | none |
| Parameter (Out) : | none |
| Description : | This hook routine is called by the operating system before executing a new task, but after the transition of the task to the running state (to allow evaluation of the TaskID by GetTaskID). |
| Particularities : | See subclause 9.1 for general description of hook routines. |
| Conformance : | BCC1, BCC2, ECC1, ECC2 |

*70*

11.8.2.3 PostTaskHook

| | |
|---|---|
| Syntax | void PostTaskHook (void) |
| Parameter (In) : | none |
| Parameter (Out) : | none |
| Description : | This hook routine is called by the operating system after executing the current task, but before leaving the task's running state (to allow evaluation of the TaskID by GetTaskID). |
| Particularities : | See subclause 9.1 for general description of hook routines. |
| Conformance : | BCC1, BCC2, ECC1, ECC2 |

*71*

EXECUTION TIME MEASUREMENT DEVICE IN A CONTROL UNIT AND AN EXECUTION TIME MEASUREMENT METHOD

BACKGROUND OF THE INVENTION

The present invention relates to an execution time measurement device in a control unit and an execution time measurement method, and particularly to an execution time measurement device in a control unit and an execution time measurement method for measuring the execution time for multiple tasks that function as a priority-assigned application under the management of a real-time operating system mounted on a control unit.

The real-time property of control in an electronic control apparatus mounted on a mobile body such as a car presents a very important requirement. To be more specific, each task activated by the real-time operating system of the electronic control apparatus is required to complete running before the temporal deadline clearly defined for each task. This requires evaluation and management of worst-case execution time (the worse-case value for execution time) for each task.

An example of the art of measuring the task execution time of the electronic control apparatus is disclosed in the Japanese Laid-Open Patent Publication No. 2001-331343. This art allows the real-time operating system itself to send the time stamp at the time of activation and termination of tasks to an external tool in the form of log information. The external tool analyzes the information collectively, and measures the temporal behavior of each task in the off-board mode (outside the electronic control apparatus).

Examples of the art of measuring the task execution time in the on-board mode (inside the electronic control apparatus) is disclosed in the Japanese Laid-Open Patent Publication No. Hei 05-165655 and Japanese Laid-Open Patent Publication No. 2001-318807. According to this art, a special hardware counter is provided in an electronic control apparatus to measure the execution time of each task. The principle is that, upon the resumption of execution of the suspended task, the stored halfway value is re-loaded into the aforementioned hardware counter. This must be followed by the step of resuming the measurement. This requires an area where the aforementioned halfway value can be stored for each task.

SUMMARY OF THE INVENTION

In a real-time system of the electronic control apparatus mounted on a mobile body, the art of analyzing data by an external tool and batch processing is basically restricted within the range of preliminary verification in the phase of prototype production. This art itself has lower applicability. In the operation control of a mobile body such as a car, there is an operation mode or user's operation method that cannot be predicted in a design phase. In many cases, problems occur due to overload of the application task at that time. For measurement of the execution time of control (task) in the electronic control apparatus mounted on a mobile body, therefore, the art that allows measurement in the on-board mode can be sad to be superior.

To be more specific, it is required that the task execution time be measured in the on-board mode (with an actual device mounted thereon) and the measured value be verified by the software itself of the electronic control apparatus, whereby trouble shooting and user alarm processing are performed. There are many fields where such processing is required.

When the time for controlling the electronic control apparatus mounted on the mobile body is measured in the on-board mode, a special hardware counter is required, as in the case of the aforementioned art. This will added to the hardware cost of the electronic control apparatus. It is also necessary to provide an area where measurement time in progress is stored for each task of the electronic control apparatus. Further, transaction between the aforementioned area and hardware counter must be made in response to the execution of the task and transition of preemptive state. This arrangement raises such problems as increase in the use of the RAM space and the use of ROM space as a result of loading the processing program. This causes an increase in overhead due to measurement processing, in addition to reduction in the memory usage efficiency. Such problems must be solved.

The present invention has been made to solve these problems. The object of the present invention is to provide an execution time measurement device in a control unit and an execution time measurement method that permit easy measurement of the execution time of the task and others in an electronic control apparatus mounted on an mobile body such as a car, wherein the aforementioned execution time measurement device and an execution time measurement method can be economically implemented on the aforementioned electronic control apparatus in the on-board mode.

To achieve this object, an execution time measurement device in a control unit according to the present invention basically comprises:

a free running counter to be updated according to time, means to push stack for working out stack data from the time-of-day value of this free running counter at the time of activation and for pushing it, means to memorize data structure of stack for memorizing the pushed stack data structure, and means to pull stack for calculating the execution time of control operation based on the time-of-day value of the free running counter upon termination of the control operation and the stack data pulled from the means to memorize data structure of stack The execution time measurement device in a control unit in the present invention uses the aforementioned arrangement to minimize the increase in hardware cost and utilizes an algorithmic means to minimize the increase in information processing cost (overhead due to measurement processing), thereby ensuring easy measurement of the control operation execution time (task or interrupt processing time).

The present invention does not require use of a special hardware counter when measuring the control operation execution time for tasks and others. The prior art has required use of a counter that permits reloading of intermediate data. The present invention, however, allows easy time measurement using a free running counter, and hence permits use of the existing hardware around the CPU, thereby minimizing a rise in hardware cost.

The known examples require use of a memory area for storing intermediate data on measurement time in progress for each task. By contrast, the present invention uses a stack structure to store the intermediate data. Moreover, this stack allows the vertical depth of the structure to be increased or decreased with the activation and termination of tasks. Upon termination of the tasks, the elements of the relevant stack are released. The vertical depth of the stack to be prepared in advance need only to be made equal to the maximum number of the tasks that may run simultaneously. This permits implementation through the use of a small RAM space.

The aforementioned control operation in the present invention is characterized by providing a task operation and/or interrupt service routine (so-called ISR) The aforementioned arrangement is concerned with the art of measuring not only the task execution time but also interrupt routine execution time and net task execution time excepting this time. If the stack management mechanism in the present invention is configured in such a way that the operation is performed only at the time of activation and termination for each task, then the execution time measurement value includes the time elapsed for processing that interrupts the task execution as interrupt processing and is executed. If one wishes to eliminate this time or to measure interrupt processing routine execution time itself, it is necessary to implement the stack management mechanism according to the present invention at the time of activation and termination for each task, as well as at the time of activation and termination of interrupt processing routine. This implementation enables measurement of interrupt execution time in addition to the task execution time.

Further, a specific embodiment of the execution time measurement device in a control unit is characterized in that the free running counter is based on concurrent use of a free running counter that supplies an OS tick interrupt.

The current real-time operating system is requires uses of a tick-time generation source that generates the minimum time increment of the system. This is often composed of an interrupt management mechanism that generates interrupts with respect to the CPU when there is an agreement of values between a hardware counter that that increments normally on the order of microseconds and a compare register that compares its value.

As in the aforementioned configuration, if the this free running counter that is necessarily present with implementation of the real-time operating system is used as a reference timer for task execution time measurement; software execution time can be measured economically without any additional hardware.

Another specific embodiment of the execution time measurement device in a control unit is characterized in that the aforementioned means to push stack and/or means to pull stack provides simultaneous computation of not only the highest stack value in the stack data structure where the stack data of the means to memorize data structure of stack is memorized as the data of vertical structure, but also the stack data in the one-step lower level.

According to this arrangement, management of the intermediate data by stack structure ensures easy access to the data pertaining to the task preempted immediately before. As shown in the aforementioned known example, if the intermediate data on computation data is stored for each task and is associated with the task management table for management, it is necessary to determine where is the area of the task preempted just before and the data pertaining thereto, and where is the area of the task to be restarted next and the data pertaining thereto, immediately after termination of the task. Despite execution of the real-time operating system, the decision on the task execution sequence itself requires information processing costs since the data must be moved by searching the area in which the relevant data is stored.

In the aforementioned arrangement of the present invention, the preempted behavior of the task is simulated synchronously with the operation of the real-time operating system on the stack by the stack structure. Accordingly, the intermediate data of the task preempted thereby at the time of context switching (when task switching has occurred) necessarily is stored in the top of the stack. Upon termination of the task, the intermediate data of the task to be restarted next can be obtained necessarily from the top of the stack. In other words, the stack structure itself retains the task suspension and execution restart information, so information processing costs based on the aforementioned search do not occur.

Still another specific embodiment of the execution time measurement device in a control unit is characterized in that the aforementioned eans to push stack" and means to pull stack are structured as software on either the application side or real-time operating system side.

The aforementioned arrangement shows that means to push stack and means to pull stack can be implemented by software. This arrangement can be achieved entirely by software without being supported by any hardware, with the result that apparatus costs are reduced.

As an embodiment of the present invention using software, there is a slight difference depending on whether the software is created as a task and is included in application software or it is included in the real-time operating system to be operated synchronously at the time of task switching. If this software is included in the real-time operating system, then the task can be developed on a decentralized basis on the application software side, without giving any consideration to the stack management operation. However, a problem arises when the relationship with other configuration is taken into account, namely, when an attempt is made to find out the execution time for interrupt processing routine outside the real-time operating system management and the net execution time of the task without this execution time. In this case, if it necessary to measure the interrupt processing time outside the real-time operating system management, then the software according to the present invention is included in the application software, application software must be created to ensure that the stack management mechanism will activate immediately before and after activation of the task and interrupt processing routine.

A further specific embodiment of the execution time measurement device in a control unit is characterized in that the aforementioned control operation execution time is the total execution time (i.e., total time indicated as a gross value including the preempted time)

The aforementioned total execution time includes the time when the relevant task is not working as it is preempted by the task of higher priority. A plurality of tasks running under the real-time operating system management are each executed in a specified activation cycle, and the priority is assigned according to the length of the activation cycle. Namely, in many configurations adopted, the higher priority is assigned as the activation cycle is shorter. In such cases, the deadline for execution of each task is equal to the next activation timing of the relevant task; in other words, the deadline is equal to the task activation cycle. Thus, in order to determine if the deadline has been exceeded or not, it is more important to monitor the total execution time from activation to termination of running in the current operation mode, regardless of whether or not the task has been preempted by another task at some midpoint, rather than to monitor the net execution time of the task. The arrangement of the present invention disclosed above refers to the usage in such a field of application.

A further specific embodiment of the execution time measurement device in a control unit is characterized in that the control operation execution time is the net execution time (i.e. CPU occupation time indicated as a net value except for the preempted time)

The aforementioned net task execution time refers to the time excepting the time of suspension by being preempted by any other task. It means the total sum of the CPU occupancy time from activation to termination of this task. Here the net task execution time is almost in one-to-one correspondence with the length of the software flow of the task, and provides an effective evaluation value for the task processing time performance verification.

Another application can be represented by the following steps; (1) a step of defining the idle task of the lowest priority that is activated when all tasks are not activated, and (2) a step of measuring the net running time per unit time, whereby time when the CPU is placed in the idle mode per unit time, namely, the CPU non-utilization ratio can be measured. If "1" is subtracted from this value, CPU occupancy rate, namely the CPU utilization ratio (CPU upload rate) by task per unit time can be measured. The arrangement of the present invention disclosed above refers to the usage in such a field of application.

A further specific embodiment of the execution time measurement device in a control unit is characterized in that the aforementioned execution time measurement device is an execution time measurement device of an electronic control apparatus mounted on a movable body such as a car to perform operation control When the execution time measurement device of the electronic control apparatus according to the present invention is mounted on a mobile body such as a car, the execution time of the control (such as task) in the electronic control apparatus can be measured in the on-bard mode by the electronic control apparatus itself in the operation control of the mobile body such as a car. This means that, if there is no operation mode or user operation method that cannot be predicted in the phase of designing this electronic control apparatus, the electronic control apparatus itself can determine and solve the problem of application task overload and others according to what is actually happening.

An execution time measurement method in a control unit according to the present invention is characterized basically by comprising: a step of working out the stack data from the time-of-day value at the time of activating the control operation, a step of pushing the stack data and memorizing the structure, a step of pulling the stack data whose structure has been memorized upon termination of the control operation, and a step of computing the control operation execution time based on the pulled stack data and the time-of-day value upon the termination A specific embodiment of the execution time measurement method in control unit according to the present invention is characterized basically is characterized in that the aforementioned control operation refers to task operation and/or interrupt service routine (so-called ISR); stack data push and/or pull operations provide simultaneous computation of not only the highest stack value in the stack data structure where said stack data is memorized as the data of vertical structure, but also the stack data in the one-step lower level; the aforementioned control operation execution time is the total execution time (i.e., total time indicated as a gross value including the preempted time); or the aforementioned control operation execution time is the net execution time which is CPU occupation time indicated as a net value except for the preempted time

DETAILED DESCRIPTION OF THE PREFERRED EMBODIMENTS

Figure 1:
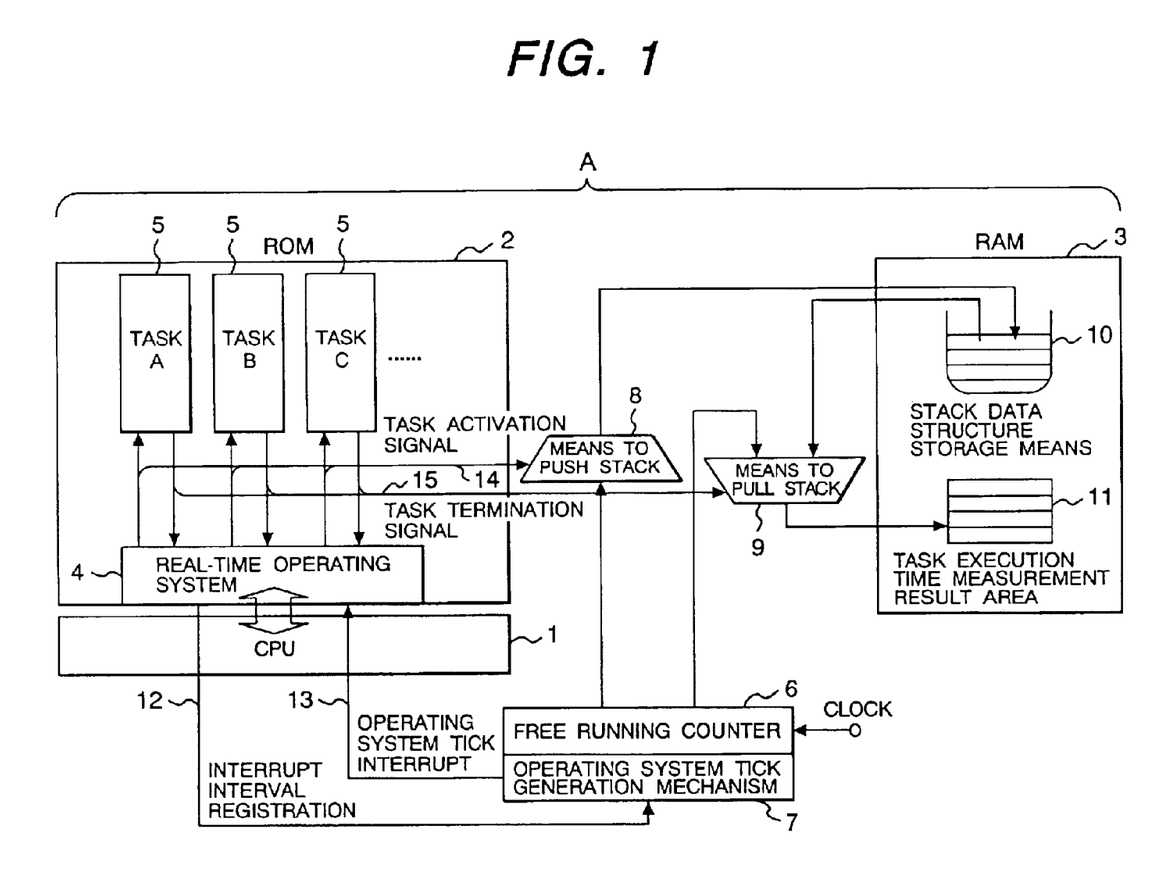
FIG. 1 is a block diagram representing an execution time measurement device in a control unit as an embodiment according to the present invention.

FIG. 1 shows one embodiment of an execution time measurement device in the control unit according to the present invention. It is a control block diagram representing the control unit A including the execution time measurement device mounted on a car as a mobile body.

the aforementioned control unit A is provided with a CPU 1, ROM 2 and RAM 3, as well as means to push stack 8 and means to pull stack 9 independent of the CPU 1, ROM 2 and RAM 3. The stack data structure storage means 10 and the task execution time measurement result area 11 are provided on the area of RAM 3. The stack data structure storage means 10 is operated by the means to push stack 8 and means to pull stack 9. The stack data structure storage means 10 is operated by the means to push stack 8 and means to pull stack 9 for storing the stack data structure. The task execution time measurement result area 11 stores the task execution time.

The ROM 2 incorporates the real-time operating system 4 and task 5 in the form of a machine code, and is configured to permit direct operation of the CPU 1.

The CPU 1 is closely linked with the real-time operating system 4, and activates multiple tasks 5 according to the scheduling rule retained therein.

A free running counter 6 is located outside the CPU 1, and counting is carried out at all times in the free running state by a clock on the order of microseconds. Accordingly, the minimum resolution of the result of measuring the execution time of the control unit operation depends on the accuracy of this the free running counter 6, and is on the order of microseconds. Further, an operating system tick generation mechanism 7 is attached to the free running counter 6.

In the initialization routine, the real-time operation system 4 registers operating system tick interrupt time intervals into the aforementioned operating system tick generation mechanism 7 (indicated by arrow 12 in FIG. 1). Subsequent to operating system activation, the minimum time intervals for task scheduling is utilized in response to operating system tick interrupt as indicated by arrow 13 in FIG. 1.

One of specific embodiments of the operating system tick generation mechanism 7 is a means which is equipped with a compare register (not illustrated) as hardware whose contents are constantly compared with those of the free running counter 6, and which adds the operating system interrupt execution interval to the contents of the free running counter 6 (or the contents one level older than those of this compare register) for each operating system tick interrupt 13, and writing the contents back, whereby the next interrupt time is reserved and the operating system tick interrupt can be obtained.

In response to the aforementioned operating system tick interrupt 13, the behavior of the real-time operating system 4 subsequent to activation of scheduling activates multiple tasks 5 according to the scheduling rule. Tasks 5 stop occupying the CPU upon termination of processing, and return the CPU 1 control to the real-time operating system 4.

In actual operation procedures, the task 5 is activated by sending the context to the CPU 1. In FIG. 1, it is represented as a task activation signal 14 (marked by an arrow in FIG. 1) for the sake of expediency. Similarly, the termination of the task 5 is carried out by releasing the task context and returning CPU occupancy to the real-time operating system 4. In FIG. 1, it is represented as a task termination signal 15 (marked by an arrow in FIG. 1) for the sake of expediency.

The following describes the means to push stack 8 and means to pull stack 9 as major components of the present embodiment.

In response to the task activation signal 14 and task termination signal 15 from the aforementioned multiple tasks 5, means to push stack 8 and means to pull stack 9 each performs the specified operations to activate the stack data structure storage means 10, and stores the task execution time into a task execution time measurement result area 11.

In the present embodiment, means to push stack 8 and means to pull stack 9 are shown in a structure independent of the CPU 1, ROM 2 and RAM 3. These two means can be implemented by software or pure hardware. Alternatively, they can be implemented by firmware provided inside the CPU 1. When it is implemented by pure hardware, it should be shown inside the ROM 2 of FIG. 1. However, means to push stack 8 and means to pull stack 9 can be formed in various embodiments, and are not limited to the present embodiment. In this sense, it is shown as independent of the CPU 1, ROM 2 and RAM 3 in FIG. 1 for the sake of expediency.

In response to the task activation signal 14, the means to push stack 8 samples the value of the free running counter 6 prior to starting activation of the task. After this value has undergone computation to be discussed later, the resulting data is pushed into the stack data structure storage means 10 on the RAM 3.

The task activation signal 14 occurs when the specified task 5 has activated from the idle state in the CPU 1. It also occurs when another task 5 is currently being performed by the CPU 1, this task 5 is preempted, and the task 5 of higher priority other than this task 5 is newly activated. Accordingly, in the latter case, there is an increase in the total number of used stack elements retained in the stack data structure storage means 10. In the example of the stack data structure shown in FIG. 1, the stack extends upward.

In response to the task termination signal 15, the means to pull stack 9 pops out the element in the highest position of the stack data structure storage means 10 immediately upon termination of the task 5. This value and the value of the free running counter 6 are subjected to computation to be discussed later. After task execution time has been worked out, the result is stored in the task execution time measurement result area 11 of the RAM 3. Thus, upon termination of the task 5, there is a decrease in the total number of used stack elements retained in the stack data structure storage means 10. The stack contracts downward in the example of the stack data structure shown in FIG. 1.

The functions of the means to push stack 8 and means to pull stack 9 can also be represented as follows: Every time the real-time operating system 4 preempts the currently active task 5 and a new task 5 is executed, what has simulated the context stack (not illustrated) of the task 5 managed by the real-time operating system 4 is formed on the stack data structure storage means 10 in the same manner.

In the present embodiment, the task execution time measurement result area 11 is divided into multiple storage areas, and the result of measuring the execution time is stored there. It is also possible to divide the storage area for each task 5 to store the result in the order of 1D of the task 5. It is also possible to divide the area according to another classification category. Further, it can be assigned according to the time series of the task termination sequence. Alternatively, it can be integrated in the only one area in terms of the result of execution time of the task that has terminated immediately before.

Figure 2:
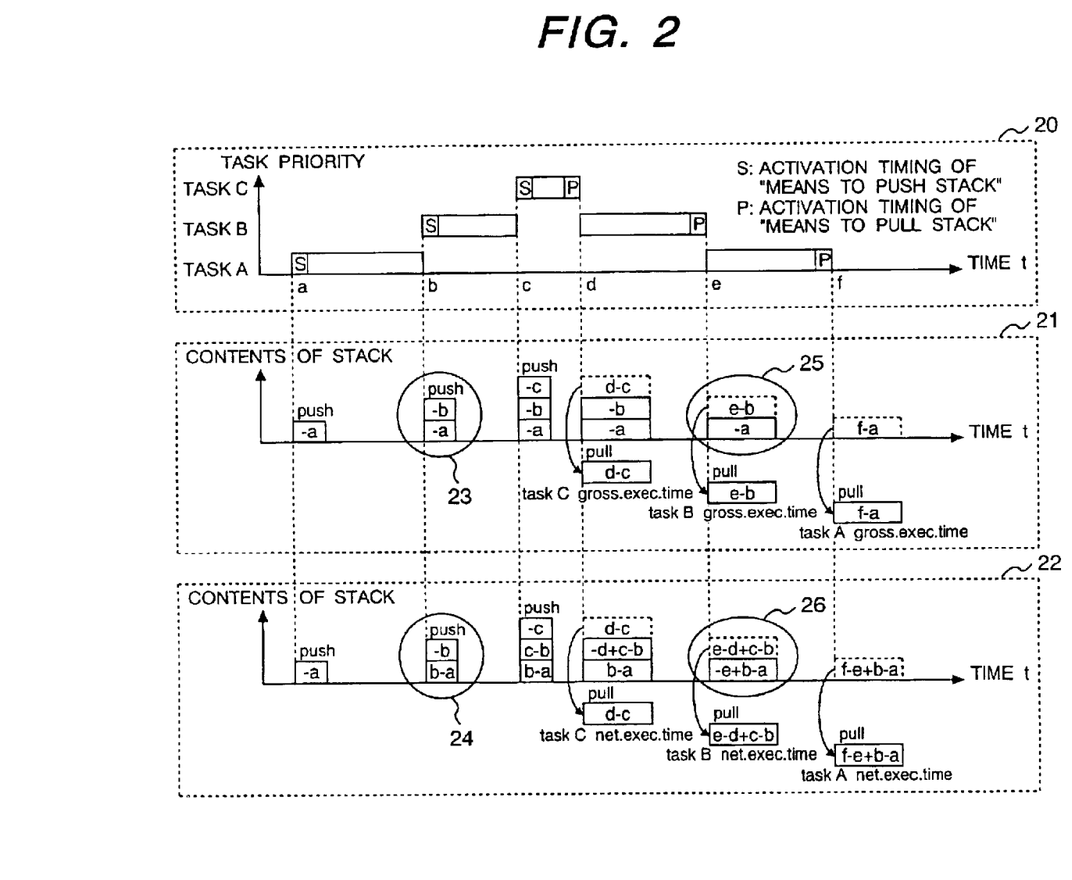
FIG. 2 is a timing chart representing the measurement operation on the time series by an execution time measurement device in a control unit in FIG. 1.

FIG. 2 shows the time chart of the execution time measurement device in the control unit according to the embodiment shown in FIG. 1. Three charts 20, 21 and 22 are given on the vertical axis, while time t is shown on the horizontal axis for all three charts.

Chart 20 shows the behavior of the execution, preemption and termination of multiple tasks A, B and C. The priority of tasks A, B and C is given on the vertical axis. In this chart 20, task A of the lowest priority is first activate (at time point a), and the task B of the intermediate priority preempts task A halfway and is activated (at time point b).

In the middle of execution of task B, this task B is preempted and the task C of higher priority is activated (at time point c). Task C runs all the way and terminates (at time point d) without being preempted by other tasks A and B. Upon the termination of task C, the right of execution is transferred to task B that has been suspended (at time point d). The task B having regained the right of execution continues running until it terminates (at time point e).

Upon termination of the execution of task B, the right of execution is transferred to task A that has been suspended (at time point e). The task A having regained the right of execution continues running until it terminates (at time point f).

Symbol S in Chart 20 denotes the time point when the means to push stack 8 is activated. Similarly, symbol P denotes the time point when the means to pull stack 9 is activated.

The time point S when the means to push stack 8 is activated and the time point P when the means to pull stack 9 is activated can be considered as behaviors in task context switch on the side of real-time operating system 4. Conversely, they can be, considered as behavior S at the time of task activation on the application task side and behavior P at the time of task termination on the application task side. This is the same as what has been discussed so far.

Chart 21 in FIG. 2 is synchronized with chart 20 in time and shows the operation of measuring the total execution time (so-called gross value) of the task. Similarly, the chart 22 is synchronized with chart 20 in time and shows the operation of measuring the net execution time (so-called nets value) of the task.

In both charts 21 and 22, the vertical axis represents the contents of the stack data structure storage means 10. They show the extension and contraction of the stack up to each of time points (from "a" to "f") resulting from generation and disappearance of tasks A, B and C in the chart 20.

The data pushed out of the stack data structure storage means 10 resulting from the activation timing P of the means to pull stack 9 and generated as execution time is shown below the horizontal axis of time t in charts 21 and 22. This execution time is stored in the task execution time measurement result area.

The following describes the behavior of the stack with reference to the chart 21: Each of the time points (from "a" to "f") resulting from generation and disappearance of the tasks A, B and C given in chart 20 is the symbolic representation of a temporal instant. At the same time, each of them is the symbolic representation of what is present in the free running counter 6 at each time point.

As the task A is activated at time point "a", "−a" obtained by reversing the plus-minus sign of the value in the free running counter 6 at that time point is stacked in the stack data structure storage means 10. The purpose of reversing this sign is to facilitate the four fundamental operations of arithmetic when the relevant task data is picked up and execution time is worked out upon subsequent termination of the relevant task. Similarly, "−b" is stacked in the stack data structure storage means 10 at time point "b". At time point "c", "−c" is stacked in the stack data structure storage means 10.

This is followed by the step of working out the execution time measurements resulting from sequential termination of tasks C, B and A in chart 21. At the time point d upon termination of the counter C, the value of the stack top and the value d of the free running counter 6 at that time are added, and the resulting data is popped out of the stack to reach the task execution time. Accordingly, the total execution time of the task C "d−c" is obtained at time point d. Similarly, at the time point e when task B has terminated, the total execution time "e−b" of task B is obtained, and at the time point f task A has terminated, the total execution time "f−a" of task A is obtained.

Here it is not necessary to take into account the borrow that occurs during computation in "d−c", "e−b" and "f−a" or the overflow of the free running counter 6 itself. This is because a more than 32-bit device is mainly used for the free running counter as a major CPU-attached device. In terms of the resolution on the order of microseconds, about 4300 seconds are required for the counter to make one cycle of the operation. Normally, the task running time of the electronic control apparatus mounted on the mobile body is on the order of tens of microseconds to tens of milliseconds. Accordingly, their computation does not require any consideration of management of the overflow in counter operations or the effect of the borrow affecting the frequency.

The following describes the measurement of the net task execution time (so-called net value) shown in Chart 22: The operation is the same as that of chart 21 up to the stack push of "−a" in the activation of task A. The difference is found in the operation subsequent to the time point b where the value is already placed on the stack.

Comparison between the stack mode 23 of chart 21 and stack mode 24 of chart 22 reveals the difference. At the time point b when task B is activated in Chart 22, the value with reversed sign "−b" of the free running counter 6 is stack-pushed at this time point. At the same time, the value "b" of the free running counter 6 is added to the stack element located one level lower.

The following describes the significance of this operation: When the "−b" is stack-pushed, the element one level lower is incorporated in the data storage area of the task (task A in this case) preempted before the task B starts running. Accordingly, addition the current reading "b" of the free running counter 6 thereto has the effect of suspending the execution time counting operation for task A.

Similarly, "−c" is stacked onto the tack top at time point C in activation of the task C, and "c" is added to the stack element located one level lower.

In working out the measurement of the net execution time resulting from sequential termination of tasks C, B and A, stack top and "d" are added at time point d when the task C has terminated, and the resulting data is popped out of the stack to reach the task execution time. This procedure is the same as that of chart 21. The difference is found in that, concurrently as the stack top is popped out, value "−d" obtained by reversing the sign of the value "d" of the free running counter 6 is added to the stack element located one level lower. Similarly, at the following time point e, "e" is added to the stack top and the resulting value is popped out. Then "−e" is added to the stack element located one level lower.

The meaning of this operation can be seen by the comparison between the stack mode 25 in chart 21 and stack mode 26 in chart 22, as described below:

In chart 22, when the execution of task B is terminated in Chart 22 and "e−d+c−b" is popped out of the stack as net time, the stack element located one level lower (stack top element subsequent to popup operation) is preempted before the task B start running, and is incorporated in the data storage area of the task (task A in this case) whose execution is to be resumed next. Thus, addition of the current reading with reversed sign "−b" of the free running counter 6 thereto has the effect of resuming time counting operation for task A at this time point.

In chart 21, therefore, only the stack top value is susceptible to the reading on the free running counter 6 during the stack operation; whereas, in chart 22, the stack top value and the stack element located one level lower (only for non-null) are susceptible to this reading.

In the aforementioned calculation, it is not necessary to take into account the borrow that occurs during computation or the overflow of the free running counter 6 itself. This is the same as that of chart 21.

Figure 3:
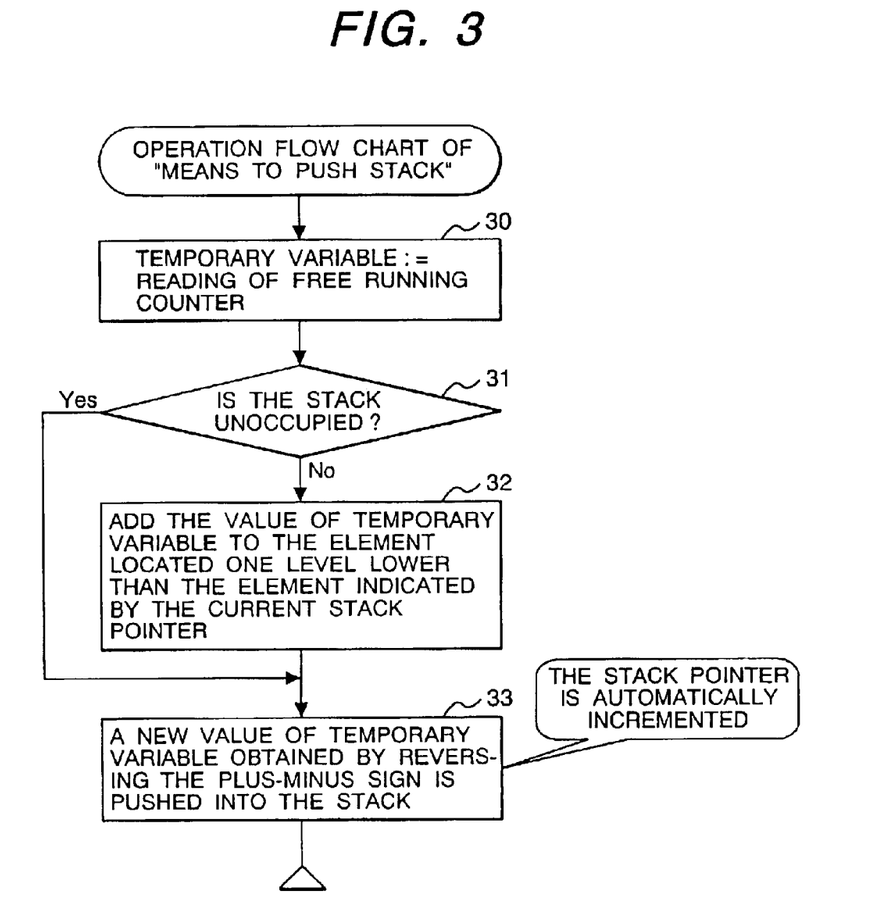
FIG. 3 is a flow chart representing the procedure of means to push stack.

FIG. 3 is a flow chart representing the operation of the means to push stack 8 in chart 22 describing the principle of working out the net task execution time. Similarly, FIG. 4 is a flow chart representing the operation of the means to pull stack 9 in chart 22.

Figure 4:
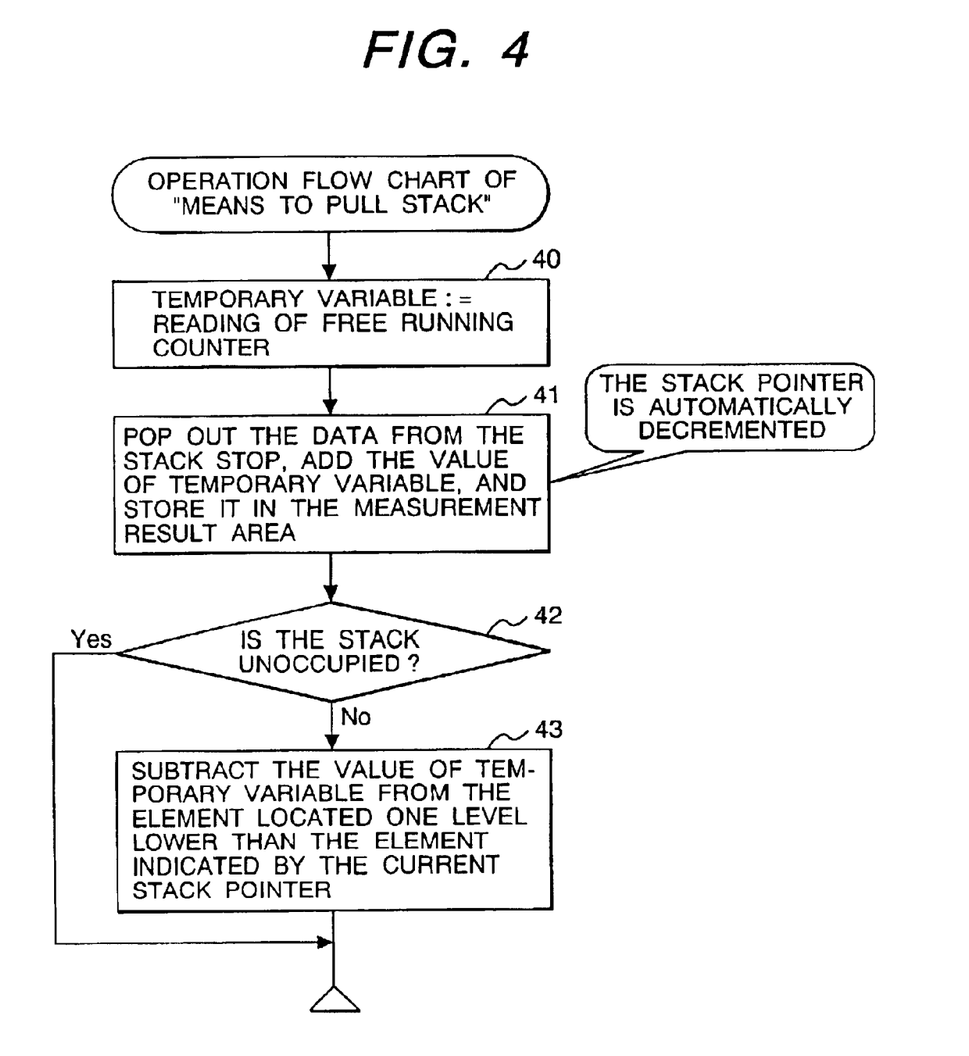
FIG. 4 is a flow chart representing the procedure of means to pull stack.

In the flow charts in FIGS. 3 and 4, a stack pointer is assumed to represent an unused stack element adjacent to the stack top. Further, the stack is assumed to expand in the direction where the stack pointer value increases. For example, this is equivalent to implementing of stack configuration, assuming in the sufficed array variable that a variable for storing the suffix is a stock point, based on the definition that the direction of fiducial value is the stack bottom and the direction where the suffix increases is a stack top.

The following describes the operation of the means to push stack 8 with reference to the flowchart of FIG. 3: Immediately after the means to push stack 8 has activated, the reading on the free running counter 6 is sampled as a temporary variable in step 30. This is followed by the step 31 of checking if the stack data structure storage means 10 is unoccupied or not. If there is any task that has been preempted and the stack is not unoccupied, then the system proceeds to step 32. If it is unoccupied, the step 33 is executed with step 32 ignored.

If the stack is non-null, the reading of the free running counter 6 sampled in step 30 is added to the element one level lower than the element indicated by the stack pointer in step 32. The stack pointer is defined as referring to an unused stack element adjacent to the stack top, so the element one level lower means the data area of the task to be preempted subsequently.

In step 33, the temporary variable with its sign reversed is newly added to the stack data structure storage means 10, and counting of the activated task starts. The stack point is automatically incremented by only "1" through this stack pushing operation, and the value is updated.

If the evaluation in Step 31 is always true and execution in step 32 is always skipped, then it should be noted that the behavior is equivalent to the measurement of the total execution time for the task shown in chart 21.

The following describes the operation of means to pull stack 9 with reference to the flow chart in FIG. 4: Immediately after activation of the means to pull stack 9 the reading of the free running counter 6 is sampled as a temporary variable in step 40. This is followed by the step 41, where the stack top data is popped out and the temporary variable is added to this data. The result is stored in the stack pointer to be decremented by "1" alone automatically, and the value is updated.

This is followed by step 42 where verification is made to see if the current stack data structure storage means 10 is unoccupied or not. If there is any task that has been preempted and the stack is not unoccupied, then the system proceeds to step 43. If it is unoccupied, the processing terminates with step 43 ignored.

If the stack is non-null, the reading of the free running counter 6 sampled in step 40 is subtracted from the element one level lower than the element indicated by the current stack pointer in step 43. The stack pointer is defined as referring to an unused stack element adjacent to the stack top, so the element one level lower means the data area of the task which has been preempted immediately before, and whose execution is to be resumed at this time point.

Similarly to the case of flow chart given in FIG. 3, if the decision in step 42 is always true and execution in step 43 is skipped at all times, then the behavior is equivalent to the total execution time measurement of the task shown in chart 21.

Figure 5:
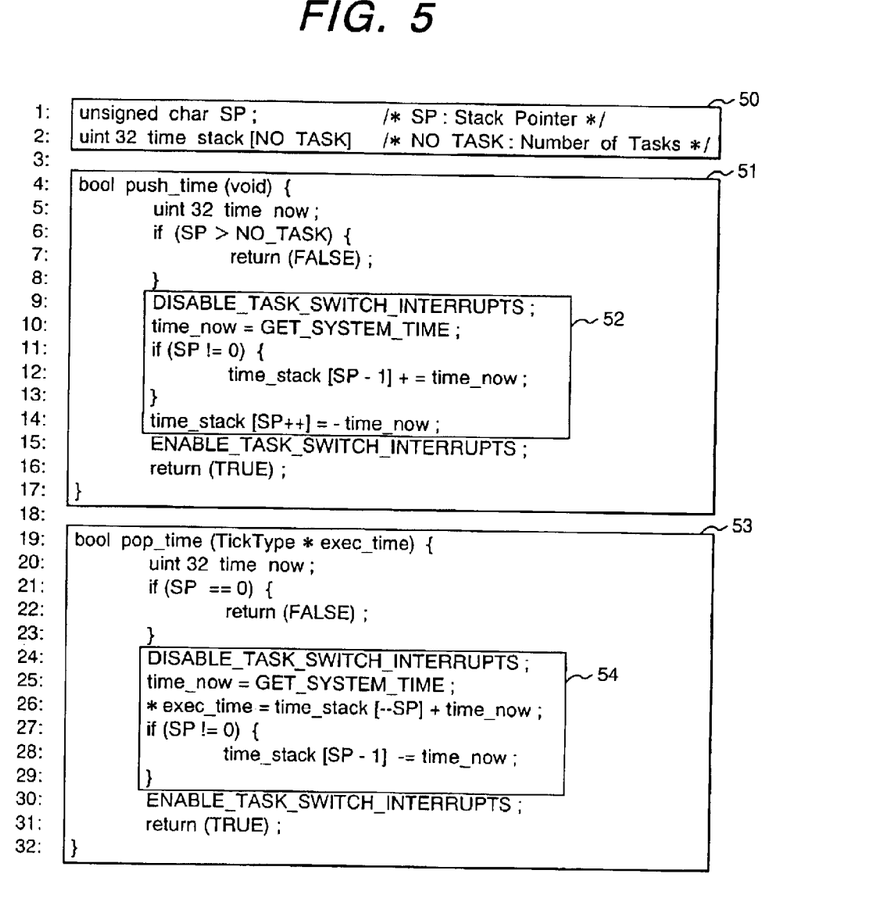
FIG. 5 is a source list for another embodiment of an execution time measurement device according to the present invention, wherein software is used for its configuration.

FIG. 5 represents another embodiment of the execution time measurement device in a control unit according to the present invention. It shows the means to push stack 8 and means to pull stack 9 are entirely implemented as software in the control unit A.

In FIG. 5, the mechanism is created in C-language. However, it can be implemented as the machine language as an assembler or as CPU-inherent firmware, fro example. Further, it can also implement in the form of a logical circuit of pure hardware.

A block 50 (line numbers 1 and 2) declares the stack point and stack data structure storage means 10. The stack is defined as the array that permits storage of the contents of the free running counter 6. Further, the variable that retains the suffix of this array is defined as a stack point, as discussed above.

A block 51 (line numbers 4 through 17) embodies the means to push stack 8. It is implemented as a function. The flow of processing is given in the flow chart of FIG. 3. It is represented in C-language, with some additional functions incorporated therein, as will be described later.

The function push_time(void) of block 51 corresponds to the function called at time point S in terms of the chart 20 of FIG. 2. There is no special restriction as to whether the subject to be called is a real-time operating system 4 or application software implemented as a task 5.

The aforementioned "Some additional functions" refer to the items described below. The function push_time(void) of block 51 is created as a function for returning the Boolean type value to the calling side. Monitoring of the return value identifies if the stack pushing operation has succeeded or not. On the call-up side, this return value is checked, whereby some trouble shooting operation can be selected.

In block 51, the temporary variable given in the flow chart of FIG. 3 is declared as an automatic variable. Accordingly, the area for this temporary variable is ensured when the function of the block 51 is called. It is used as a throwaway variable that is released upon termination of the processing of this function.

Line numbers 6 through 8 denote the defensive programming that is not given in the flow chart of FIG. 3. Prior to the stack pushing operation, verification is made to check whether or not all the elements of the stack data structure storage means 10 have been used without any further space. If there is no unoccupied space, the declaration (line number 2) of the stack data structure storage means 10 is faulty in static terms, or the stack pushing and pulling operations are not correctly carried out in a pair in dynamic terms. In line number 7, the return value of the function is identified as "FALSE", and performance of the stack pushing operation terminates.

If there is any unoccupied space in the stack, processing equivalent to that of the operation flow given in the flow chart of FIG. 3 is carried out in the following block 52. In line number 16, the function return value is identified as "TRUE", and performance of the stack pushing operation terminates.

However, the block 52 is designed as an interrupt prohibition section sandwiched between the interrupt disable command "DISABLE_TASK_SWITCH_INTERRUPTS" of line number 9 and interrupt prohibition release command "ENABLE_TASK_SWITCH_INTERRUPTS" of line number 15, for the following reasons:

The block 52 is responsible for the operation of the block data array value and updating of the stack pointer. These operations must be performed as one inseparable (atomic) operation. Otherwise, consistency as a stack data will be lost. However, as far as the example of implementation according to the present embodiment is concerned, the function of the block 51 is called as the context of an application task, namely, in the operating system interrupt enable mode, not as a part of the real-time operating system 4 from the interrupt prohibition section.

Accordingly, it may happen that another task of higher priority is activated during execution of the block 52, and the block 51 (or block 53 to be described later) is called again, with the result that block 52 (block 54 to be described later as a form of similar processing) is executed in a multiplex mode in the middle of the execution of block 52. If this situation occurs, the contents of the stack data structure storage means 10 is destined to be destroyed. To protect against this trouble, the block 52 is defined as an interrupt prohibition section.

Line number 10 of FIG. 5 corresponds to step 30 of FIG. 3. Similarly, line number 11 corresponds to step 31, line number 12 to step 32 and line number 14 to step 33.

Block 53 (line numbers 19 through 32) embodies the means to pull stack 9. It is implemented as a function. In the flow of processing, what is disclosed in FIG. 4 is represented directly in C-language, but it contains some additional functions, as will be described later.

As compared to the chart 20 in FIG. 2, the function pop_time(TickType *) corresponds to the function that is called at time point P. There is no restriction as to whether the calling subject is a real-time operating system 4 or application software implemented as task 5, similarly to the case of block 51.

The aforementioned "Some additional functions" refer to the items described below. The function pop_time (TickType *) of block 53 is created as a function for returning the Boolean type value to the calling side. Monitoring of the return value identifies if the stack pulling operation has succeeded or not. Further, it is created as an argument of the function to pass the pointer to the task execution time measurement result area 11. Accordingly, the reading is automatically stored into the task execution time measurement result area 11 from inside the function.

In block 53, the temporary variable shown in FIG. 4 is similarly declared as an automatic variable, as indicated by line number 20. Accordingly, the area for this temporary variable is ensured when the function of the block 53 is called, and is released upon termination of the processing of this function.

Line numbers 21 through 23 indicate defensive programming not given in the flow chart of FIG. 4. Prior to stack pulling operation verification is made to check if the stack data structure storage means 10 is unoccupied or not. If it is unoccupied, the stack pushing and pulling operations are not correctly carried out in dynamic terms. In line number 22, the return value of the function is identified as "FALSE", and performance of the stack pulling operation terminates.

If the stack is not unoccupied, processing equivalent to that shown in the operation flow of FIG. 4 is performed in the following block 54 and the return value of the function is identified as "TRUE" in line number 31 and execution terminates.

However, the block 54 is set as an interrupt prohibition section sandwiched between the interrupt disable command "DISABLE_TASK_SWITCH_INTERRUPTS" of line number 24 and interrupt prohibition release command "ENABLE_TASK_SWITCH_INTERRUPTS" of line number 30, for the same reasons already described with reference to the block 52.

In other words, the block 54 is responsible for the operation of the stack data array value and updating of the stack pointer. These operations must be performed as one inseparable (atomic) operation. Otherwise, consistency as a stack data will be lost. However, as far as the example of implementation according to the present embodiment is concerned, the function of the block 53 is called as the context of an application task, namely, in the operating system interrupt enable mode, not as a part of the real-time operating system 4 from the interrupt prohibition section.

Accordingly, it may happen that another task of higher priority is activated during execution of the block 54, and the block 53 (or block 51) is called again, with the result that block 54 (block 52) is executed in a multiplex mode in the middle of the execution of block 54. If this situation occurs, the contents of the stack data structure storage means 10 is destined to be destroyed. To protect against this trouble, the block 54 is defined as an interrupt prohibition section.

Unlike the present embodiment, however, if the functions of these blocks 51 and 53 are called from the interrupt prohibition section as part of the real-time operating system 4, not as the context of the application task (i.e. operating system interrupt enable mode), then the interrupt disable processing of blocks 52 and 54 are not required, needless to say.

The line number 25 in FIG. 5 corresponds to the step 40 in FIG. 4. Similarly, the line number 26 corresponds to step 41, line number 27 to step 42, and line number 28 to step 43.

The following describes the mechanism of calling up the functions described with reference to FIG. 5 at the time of activation and termination of the task:

The OSEK/VDX has come to be used in greater numbers as a real-time operating system mounted on the electronic control apparatus for mobile body in recent years in Europe and other countries. International standardization of specifications is currently promoted according to the ISO (i.e. ISO TC22/SC3/WG1/TF1), and the OSEK/VDX is destined to be utilized over an extensive range as a real-time operating system for automobiles in future.

Figure 6:
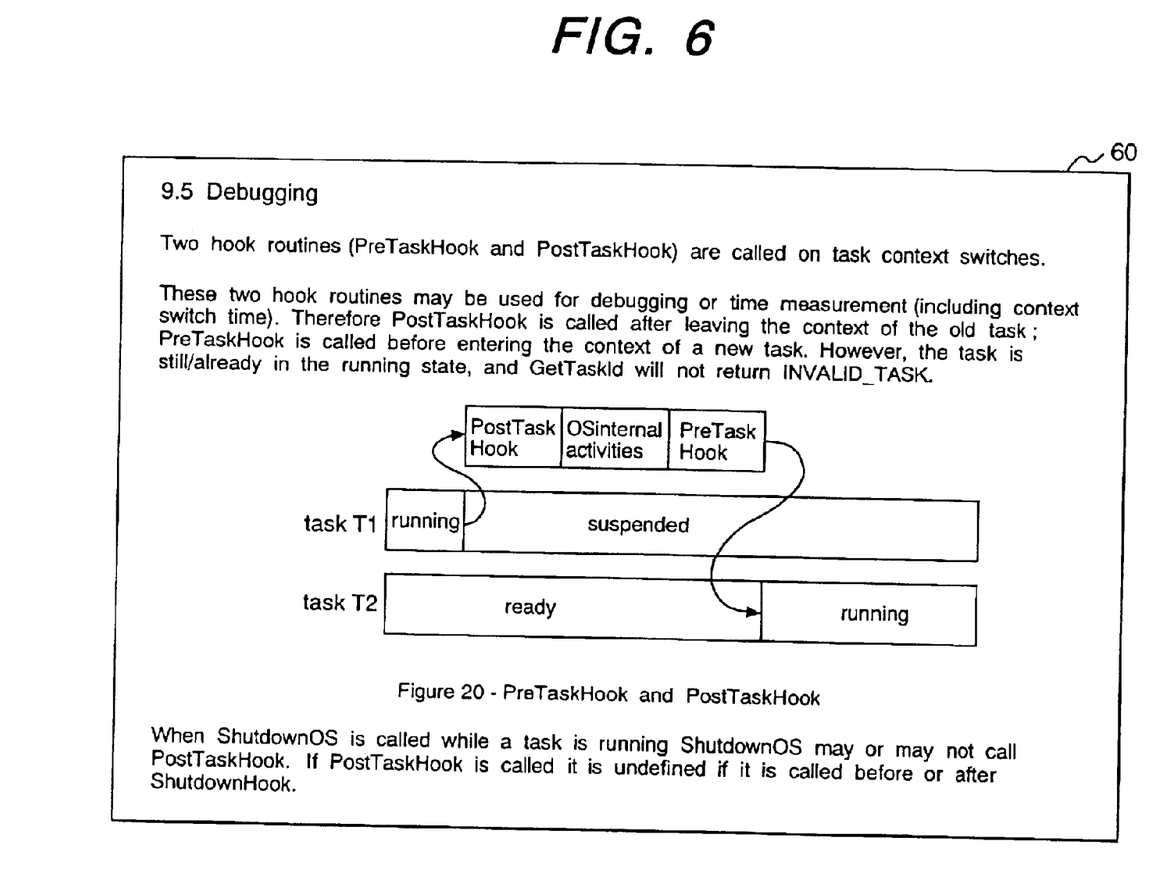
FIG. 6 is an explanatory diagram quoted from the commentary of the OSEK/VDX specifications.
Figure 7:
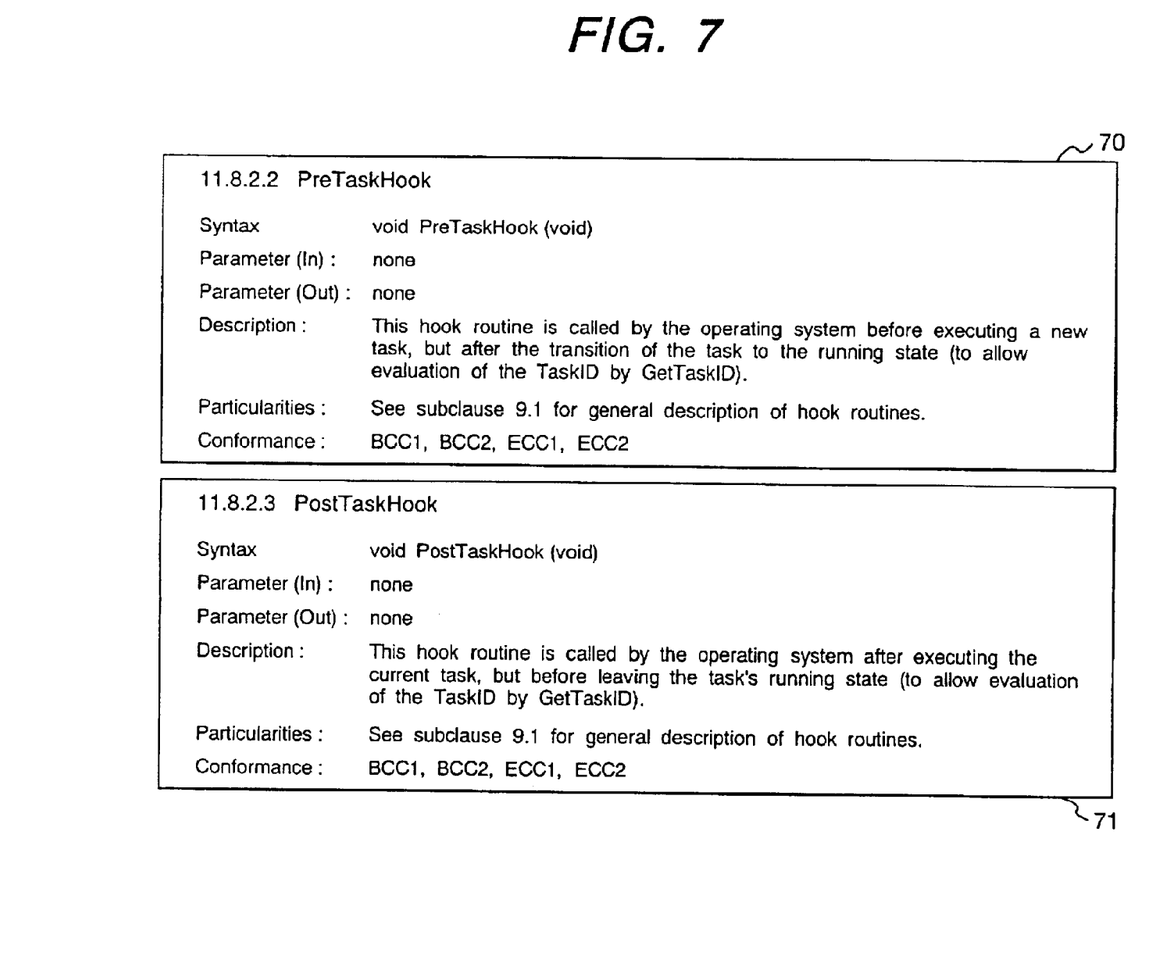
FIG. 7 is an explanatory diagram quoted from the function specification definition of the OSEK/VDX hook routine.

FIG. 6 is an extract from the commentary of the debugging hook routines "PreTaskHook" and "PostTaskHook" as part of the OSEK/VDX specifications. Numeral 70 in FIG. 7 shows the definition of the function specifications in this "PreTaskHook", and numeral 71 in FIG. 7 that in the "PostTaskHook".

As described above, the OSEK/VDX is complete with the "PreTaskHook" as hook routines to be executed prior to task activation and "PostTaskHook" to be executed prior to task termination. If the function created by the user is called via these hook routines, the system provides easy execution of the user defined operations synchronously with the task context switching.

In other words, symbol S indicated in chart 20 of FIG. 2 denotes "PretaskHook" in terms of the OSEK/VDX specifications. Similarly, symbol P indicates the point of time when "PostTaskHook" activates. Accordingly, the function push_time(void) disclosed in block 51 of FIG. 5 is registered in the "PreTaskHook" and the function pop_time (TickType *) is registered in the "PostTaskHook". This arrangement allows very easy implementation of this embodiment as long as the OSEK/VDX is used as a real-time operating system. It permits the task to be created without being conscious of the presence of the function for measuring the execution time.

For the OSEK/VDX specifications, it depends on implementation dependency matters of the operating system vendor whether the "PreTaskHook" and "PostTaskHook" are called from the interrupt prohibition section as part of the real-time operating system 4 or as the context of the application task (i.e. OS interrupt enable mode). The latter case requires interrupt prohibition control as given in blocks 52 and 54 shown in FIG. 5.

Needless to say, it does not follow that this present embodiment can be mounted only on the operating system according to the OSEK/VDX specifications. Application is permitted when the functions described with reference to this present embodiment are implemented on any type of the real-time operating system at the time of activation and termination of all tasks.

Several embodiments according to the present invention have been described. However, it is to be understood that the present invention is not restricted to these embodiments. Design changes are possible without departing from the spirit described in the Claims of the present invention.

Application in measuring the task execution time has been mainly described in the aforementioned embodiments. This concept mentioned above can also be applied to the interrupt processing routine of higher priority than the task, in addition to the task.

Not only the execution time of the task but also that of the interrupt processing routine can be measured if arrangement is made to activate the function of the means to push stack 8 with the start of interrupt processing routine, and to activate the function of the means to pull stack 9 with the termination of interrupt processing routine. This is made apparent by reading "task C or B" plotted on the vertical axis of chart 20 of FIG. 2 as "the interrupt processing routine".

When the aforementioned arrangement is compared with the arrangement where operation is performed only at the time of activation and termination of each task, the time elapsed for interruption and execution in interrupt processing during execution of the task is removed from the readings of task execution time. On the other hand, the interrupt processing time is derived independently of the task, as discussed earlier.

In the aforementioned embodiment, the execution time measurement device in the control unit according to the present invention is described to be used when mounted on the mobile body of a car or the like. It is applicable to the electronic control apparatus of other equipment, in addition to the mobile body such as a car.

As is apparent from the above description, the execution time measurement device in the control unit according to the present invention minimizes the increase of the hardware cost, and information processing cost (overhead of measurement processing) in algorithmic terms, thereby permitting measurement of the task (or the interrupt processing time).

Further, in the measurement of the task execution time, both the total execution time (gross value) and net execution time (net value) can be measured using a common arrangement. The system allows switching between these two types of values by partial modification of the stack operating algorithm.

Further, the progress of execution time measurements is managed by the stack data structure storage means. This arrangement provides easy implementation from outside the real-time operating system without having to correct the task data structure managed by the real-time operating system 4. What is more, implementation is possible by minimizing the consumption of the RAM resource.

What is claimed is:

1. An execution time measurement device in a control unit comprising:
   a free running counter to be updated according to time,
      means to push stack for working out stack data from the time-of-day value of said free running counter at the time of activation and for pushing it,
      means to memorize data structure of stack for memorizing the pushed stack data structure, and
      means to pull stack for calculating the execution time of control operation based on the time-of-day value of the free running counter upon termination of the control operation and the stack data pulled from the means to memorize data structure of stack.

2. An execution time measurement device in a control unit according to claim 1, wherein said control operation provides a task operation and/or interrupt service routine.

3. An execution time measurement device in a control unit according to claim 1, wherein the free running counter is based on concurrent use of a free running counter that supplies an OS tick interrupt.

4. An execution time measurement device in a control unit according to claim 1 wherein said means to push stack and/or means to pull stack provides simultaneous computation of not only the highest stack value in the stack data structure where the stack data of said means to memorize data structure of stack is memorized as the data of vertical structure, but also the stack data in the one-step lower level.

5. An execution time measurement device in a control unit according to claim 1, wherein said means to push stack and means to pull stack are structured as software on either the application side or real-time operating system side.

6. An execution time measurement device in a control unit according to claim 1, wherein said control operation execution time is the total execution time which is total time indicated as a gross value including the preempted time.

7. An execution time measurement device in a control unit according to claim 1, wherein said control operation execution time is the net execution time which is CPU occupation time indicated as a net value except for the preempted time.

8. An execution time measurement device in a control unit according to claim 1, wherein said execution time measurement device is an execution time measurement device of an electronic control apparatus mounted on a movable body such as a car to perform operation control.

* * * * *